US011675133B2

United States Patent
Mosti et al.

(10) Patent No.: US 11,675,133 B2
(45) Date of Patent: Jun. 13, 2023

(54) OPTICAL ADD/DROP DEVICE AND ASSEMBLY, AND COMMUNICATIONS NETWORK NODE

(71) Applicant: Telefonaktiebolaget LM Ericsson (PUBL), Stockholm (SE)

(72) Inventors: Sergio Mosti, Genoa (IT); Sergio Lanzone, Genoa (IT); Marco Assale, Genoa (IT); Claudio D'Incà, Genoa (IT); Alberto Deho, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/289,984

(22) PCT Filed: Oct. 30, 2018

(86) PCT No.: PCT/EP2018/079730
§ 371 (c)(1),
(2) Date: Apr. 29, 2021

(87) PCT Pub. No.: WO2020/088746
PCT Pub. Date: May 7, 2020

(65) Prior Publication Data
US 2021/0396933 A1 Dec. 23, 2021

(51) Int. Cl.
*H04B 10/00* (2013.01)
*G02B 6/293* (2006.01)
(Continued)

(52) U.S. Cl.
CPC ..... *G02B 6/29365* (2013.01); *G02B 6/29383* (2013.01); *G02B 6/4246* (2013.01); *H04B 10/2589* (2020.05)

(58) Field of Classification Search
CPC ............ G02B 6/29365; G02B 6/29383; G02B 6/4246; G02B 6/2938; G02B 6/29395;
(Continued)

(56) References Cited

U.S. PATENT DOCUMENTS 5,872,883 A * 2/1999 Ohba ...................... G02B 6/125
385/129
6,198,857 B1 * 3/2001 Grasis ................ G02B 6/29365
385/47
(Continued)

FOREIGN PATENT DOCUMENTS

WO          00 52864          9/2000

OTHER PUBLICATIONS

PCT International Search Report issued for International application No. PCT/EP2018/079730—dated Jul. 15, 2019.
(Continued)

*Primary Examiner* — Pranesh K Barua
(74) *Attorney, Agent, or Firm* — Baker Botts L.L.P.

(57) ABSTRACT

An optical add/drop device (100) comprising: a common port (102); an add port (106); a first wavelength selective optical filter (110) configured to: receive an optical signal at an add wavelength from the add port and transmit said optical signal at the add wavelength towards the common port; and receive optical signals from the common port and reflect optical signals not at the add wavelength; a second wavelength selective optical filter (114) configured to receive said optical signals from the common port reflected by the first wavelength selective optical filter and transmit an optical signal at a drop wavelength, different to the add wavelength; a drop port (116); and an optical waveguide (118) configured receive said optical signal at the drop wavelength transmitted by the second wavelength selective optical filter and route said optical signal to the drop port.

13 Claims, 7 Drawing Sheets

(51) Int. Cl.
*H04B 10/25* (2013.01)
*G02B 6/42* (2006.01)

(58) Field of Classification Search
CPC .. H04B 10/2589; H04J 14/0201; H04J 14/021
See application file for complete search history.

(56) References Cited

U.S. PATENT DOCUMENTS

| | | | |
|---|---|---|---|
| 6,842,559 B1* | 1/2005 | Florence | G02B 6/29383 385/47 |
| 7,171,081 B1 | 1/2007 | Ko et al. | |
| 2002/0110313 A1* | 8/2002 | Anigbo | G02B 6/29362 385/24 |
| 2003/0194165 A1* | 10/2003 | Silberberg | G02B 6/272 385/11 |
| 2004/0042710 A1* | 3/2004 | Margalit | G02B 6/29362 385/24 |
| 2004/0130764 A1* | 7/2004 | Stenger | G02B 26/00 359/892 |
| 2017/0250773 A1* | 8/2017 | Huh | G02B 6/2938 |
| 2020/0400889 A1* | 12/2020 | Kardos | G02B 6/29362 |

OTHER PUBLICATIONS

PCT Written Opinion of the International Searching Authority issued for International application No. PCT/EP2018/079730—dated Jul. 15, 2019.

* cited by examiner

OPTICAL ADD/DROP DEVICE AND ASSEMBLY, AND COMMUNICATIONS NETWORK NODE

PRIORITY

This nonprovisional application is a U.S. National Stage Filing under 35 U.S.C. § 371 of International Patent Application Serial No. PCT/EP2018/079730 filed Oct. 30, 2018 and entitled "OPTICAL ADD/DROP DEVICE AND ASSEMBLY, AND COMMUNICATIONS NETWORK NODE" which is hereby incorporated by reference in its entirety.

TECHNICAL FIELD

The invention relates to an optical add/drop device, an optical add/drop assembly and a communications network node.

BACKGROUND

Optimization of resources is a must when a telecommunications network is designed, in order to reduce both costs and space occupation. Single Fibre Working, SFW, is a way to optimize optical fibre utilization and is a good solution for network managers who have to face limited fibre capacity and budgets. With SFW, the same optical fibre is used to transport traffic in both directions. In the simplest scenario, this is possible using two different wavelengths in the two directions; uplink and downlink. SFW may also be used when the two directions are used to transport an aggregation of wavelengths, obtained via dense or coarse wavelength division multiplexing, DWDM or CWDM; for example, $\lambda 1$, $\lambda 3$, $\lambda 5$, etc. may be used in one direction and $\lambda 2$, $\lambda 4$, $\lambda 6$, etc. in the other direction. SFW enables a fibre's capacity to be doubled, reducing the costs for cabling, material and installation. For instance, a ring network can be built using just one fibre, transporting an aggregation of wavelengths, and adding/dropping some wavelengths at each node.

Currently, passive filters, such as the Ericsson Fronthaul 6020 and 6080 passive DWDM filters, are provided in a module externally connected to a node, and are configured to receive in input a single fibre in SFW mode and add/drop N wavelengths from an aggregated signal transported on the fibre. Dropped wavelengths are then connected to optical modules, e.g. DWDM or CWDM transceivers, within the node. Currently available passive filter modules have dimensions in the range 250/350×200/300×100/120. They are designed for network scenarios where a number of wavelengths are to be added/dropped per node.

SUMMARY

It is an object to provide an improved optical add/drop device. It is a further object to provide an improved optical add/drop assembly. It is a further object to provide an improved communications network node.

An aspect of the invention provides an optical add/drop device comprising a common port, an add port, a drop port, a first wavelength selective optical filter, a second wavelength selective optical filter and an optical waveguide. The first wavelength selective optical filter is configured to receive an optical signal at an add wavelength from the add port and transmit said optical signal at the add wavelength towards the common port. The first wavelength selective optical filter is also configured to receive optical signals from the common port and reflect optical signals not at the add wavelength. The second wavelength selective optical filter is configured to receive said optical signals from the common port reflected by the first wavelength selective optical filter. The second wavelength selective optical filter is also configured to transmit an optical signal at a drop wavelength, different to the add wavelength. The optical waveguide is configured receive said optical signal at the drop wavelength transmitted by the second wavelength selective optical filter and to route said optical signal to the drop port.

The optical add/drop device advantageously enables add and drop of a single wavelength from an aggregated optical signal transported in an SFW mode of operation.

The structure of the optical add/drop device may enable it to have smaller dimensions than prior art passive filter external modules. The structure of the optical add/drop device may also enable it to be connected directly pluggable optical transceiver modules, such as small form factor pluggable, SFP, optical transceivers. The pluggability directly into optical transceiver modules advantageously avoids the need for passive add/drop filters to be provided in an external module. Further space saving as compared to the currently used passive filter external modules may also be achieved since it avoids the need to use optical patch-cords to connect to optical transceiver modules.

In an embodiment, the optical add/drop device further comprises an express port. The second wavelength selective filter is additionally configured to receive said optical signals from the common port reflected by the first wavelength selective optical filter and reflect optical signals not at the drop wavelength towards the express port. The second wavelength selective filter is additionally configured to receive optical signals from the express port and reflect optical signals not at the drop wavelength. The first wavelength selective filter is additionally configured to receive said optical signals from the express port reflected by the second wavelength selective filter and reflect said optical signals towards the common port.

The optical add/drop device is therefore also able to transparently route express channels, i.e. those not required to be dropped by the device.

In an embodiment, the optical signals propagate in free space between the common port and the first wavelength selective filter and between the first wavelength selective filter and the second wavelength selective filter. Use of free space optics may enable the size of the optical add/drop device to be smaller than if optical fibre was used, which would require greater space to accommodate fibre management and splices.

In an embodiment, the optical signals propagate in free space between the express port and the second wavelength selective filter and between the first wavelength selective filter and the second wavelength selective filter. Use of free space optics may enable the size of the optical add/drop device to be smaller than if optical fibre was used, which would require greater space to accommodate fibre management and splices.

In an embodiment, the optical waveguide has a curved path from the second wavelength selective optical filter to the drop port. Use of a curved wavelength advantageously enables the end of the optical waveguide to be located flat to the back of the second wavelength selective filter, i.e. substantially normal to the optical beam, so that the dropped channel is within the acceptance angle of the waveguide and correctly enters the waveguide. Use of a curved waveguide may also assist in minimizing the footprint of the optical add/drop device.

In an embodiment, the optical waveguide comprises an optical fibre mounted in an optical ferule having a curved bore. The optical fibre therefore has a curved path from the second wavelength selective optical filter to the drop port. Use of an optical fibre mounted in a curved ferule advantageously enables the end of the optical fibre to be located flat to the back of the second wavelength selective filter, i.e. substantially normal to the optical beam, so that the dropped channel is within the acceptance angle of the fibre and correctly enters the fibre. Use of a curved ferule and fibre may also assist in minimizing the footprint of the optical add/drop device.

In an embodiment, the first wavelength selective filter is configured to transmit a first wavelength channel of a wavelength grid of the communications network and reflect all other wavelength channels of said wavelength grid. The second wavelength selective filter is configured to transmit a second wavelength channel of said wavelength grid, different to the first wavelength channel, and reflect all other wavelength channels of said wavelength grid.

In an embodiment, at least one of the first wavelength selective filter and the second wavelength selective filter comprises an optical thin film filter comprising a multi dielectric periodic structure.

In an embodiment, the optical add/drop device further comprises a mirror configured to reflect all wavelength channels received from the first wavelength selective filter towards the second wavelength selective filter and to reflect all wavelength channels received from the second wavelength selective filter towards the first wavelength selective filter.

In an embodiment, the add port and the drop port comprise small form factor optical fibre connectors configured to be pluggable directly into complementary connector sockets on an optical transceiver module.

Corresponding embodiments and advantages apply equally to the optical add/drop assembly and the communications network node described below.

A further aspect of the invention provides an optical add/drop assembly comprising an optical add/drop device and an optical transceiver module. The optical add/drop device comprises a common port, an add port, a drop port, a first wavelength selective optical filter, a second wavelength selective optical filter and an optical waveguide. The first wavelength selective optical filter is configured to receive an optical signal at an add wavelength from the add port and transmit said optical signal at the add wavelength towards the common port. The first wavelength selective optical filter is also configured to receive optical signals from the common port and reflect optical signals not at the add wavelength. The second wavelength selective optical filter is configured to receive said optical signals from the common port reflected by the first wavelength selective optical filter. The second wavelength selective optical filter is also configured to transmit an optical signal at a drop wavelength, different to the add wavelength. The optical waveguide is configured receive said optical signal at the drop wavelength transmitted by the second wavelength selective optical filter and to route said optical signal to the drop port. The optical transceiver module comprises an output port and an input port. The optical transceiver module is configured to transmit an optical signal at the add wavelength from the output port and to receive an optical signal at the drop wavelength at the input port. The add port of the optical add/drop device is connected to the output port of the optical transceiver module and the drop port of the optical add/drop device is connected to the input port of the optical transceiver module.

In an embodiment, the optical add/drop assembly comprises a plurality of optical transceiver modules and a plurality of optical add/drop devices each connected to a respective one of the optical transceiver modules. Each said optical transceiver module-optical add/drop device pair is configured to operate at a respective one of a plurality of add wavelengths and a respective one of a plurality of drop wavelengths. The optical add/drop devices are connected in series with the common port and the express port of adjacent pairs of the optical add/drop devices being connected.

Connecting optical add/drop devices together in this 'daisy-chain' type configuration enables the optical add/drop assembly to be used where a plurality of wavelengths have to added/dropped at the same node. The need for passive filters to be provided in a external module can therefore be avoided even in scenarios where a plurality of wavelengths have to be added/dropped at the same site.

In an embodiment, the output port and the input port of a said optical transceiver module comprise optical connector sockets configured to receive small form factor optical fibre connectors. The add port and drop port small form factor optical fibre connectors of a said optical add/drop device are directly plugged into the output port and input port optical connector sockets of a said optical transceiver module.

Corresponding embodiments and advantages apply equally to the communications network node described below.

A further aspect of the invention provides a communications network node comprising an optical add/drop assembly comprising an optical add/drop device and an optical transceiver module. The optical add/drop device comprises a common port, an add port, a drop port, a first wavelength selective optical filter, a second wavelength selective optical filter and an optical waveguide. The first wavelength selective optical filter is configured to receive an optical signal at an add wavelength from the add port and transmit said optical signal at the add wavelength towards the common port. The first wavelength selective optical filter is also configured to receive optical signals from the common port and reflect optical signals not at the add wavelength. The second wavelength selective optical filter is configured to receive said optical signals from the common port reflected by the first wavelength selective optical filter. The second wavelength selective optical filter is also configured to transmit an optical signal at a drop wavelength, different to the add wavelength. The optical waveguide is configured receive said optical signal at the drop wavelength transmitted by the second wavelength selective optical filter and to route said optical signal to the drop port. The optical transceiver module comprises an output port and an input port. The optical transceiver module is configured to transmit an optical signal at the add wavelength from the output port and to receive an optical signal at the drop wavelength at the input port. The add port of the optical add/drop device is connected to the output port of the optical transceiver module and the drop port of the optical add/drop device is connected to the input port of the optical transceiver module.

The node simplifies the design of a network based on SFW technique, avoiding the need of external passive add/drop filter modules, therefore saving space, costs and simplifying the network installation Embodiments of the invention will now be described, by way of example only, with reference to the accompanying drawings.

DETAILED DESCRIPTION

The same reference numbers will used for corresponding features in different embodiments.

Figure 1:
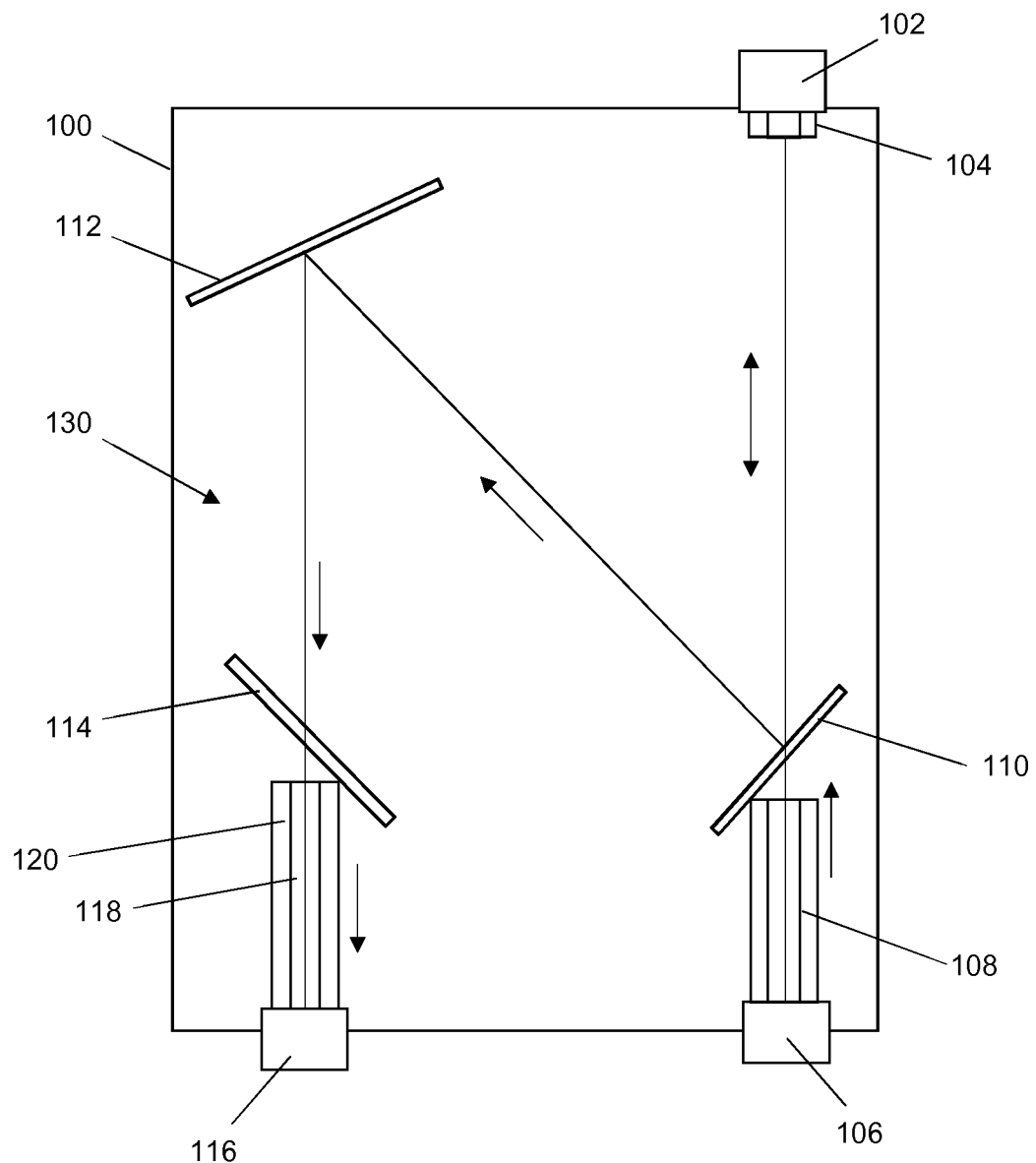
FIGS. 1 to 4 illustrate optical add/drop devices according to embodiments of the invention.

Referring to FIG. 1, an embodiment of the invention provides an optical add/drop device 100 comprising a common port 102, an add port 106, a drop port 116, a first wavelength selective optical filter 110, a second wavelength selective optical filter 114 and an optical waveguide 118.

The first wavelength selective optical filter 110 is configured to receive an optical signal, at an add wavelength, from the add port 106 and transmit this optical signal towards the common port 102. A first collimator lens 108 is provided between the add port and the first wavelength selective optical filter and a second collimator lens 104 is provided at the common port 102.

The first wavelength selective optical filter 110 is also configured to receive optical signals from the common port and reflect received optical signals that are not at the add wavelength. In this embodiment, the optical signals received from the common port are reflected towards a full mirror 112, which is configured to reflect optical signals at all wavelengths towards the second wavelength selective optical filter. The full mirror 112 is not an essential feature, other arrangements of the ports 102, 106, 116 may be used which do not require use of a mirror to direct the optical signals towards the second wavelength selective optical filter. For example, the drop port 116 may be on a same end as the common port 102 or may be on a side. Use of the full mirror 112 advantageously enables the add port 106 and the drop port to be on a same side of the device 130.

The second wavelength selective optical filter 114 is configured to receive the optical signals from the common port, as reflected by the first wavelength selective optical filter 110 and the mirror 112, and to transmit a received optical signal that is at a drop wavelength. The drop wavelength is different to the add wavelength. The add wavelength and the drop wavelength are preselected for the optical add/drop device but it will be understood that different pairs of add and drop wavelengths can be selected for different optical add/drop devices.

The optical waveguide 118 is configured receive the optical signal at the drop wavelength, as transmitted by the second wavelength selective optical filter, and route the optical signal at the drop wavelength to the drop port 116.

In an embodiment, the optical signals propagate in free space between the common port 102 and the first wavelength selective optical filter 110 and between the first wavelength selective filter, the mirror 112 and the second wavelength selective optical filter 114.

In an embodiment, the first and second wavelength selective optical filters are multi dielectric periodic structures configured to transmit an optical signal if its wavelength is aligned with a periodicity of the structure, and to reflect optical signals at all other wavelengths. This optical filter implementation with a multi-dielectric structure is known as thin film filter technology, TFF.

In an embodiment, the first wavelength selective optical filter 110 is configured to transmit a first wavelength channel of a wavelength grid of the communications network and to reflect all other wavelength channels of the wavelength grid. The second wavelength selective optical filter 114 is configured to transmit a second wavelength channel of the wavelength grid and reflect all other wavelength channels of the wavelength grid. The second wavelength channel is different to the first wavelength channel.

Figure 2:
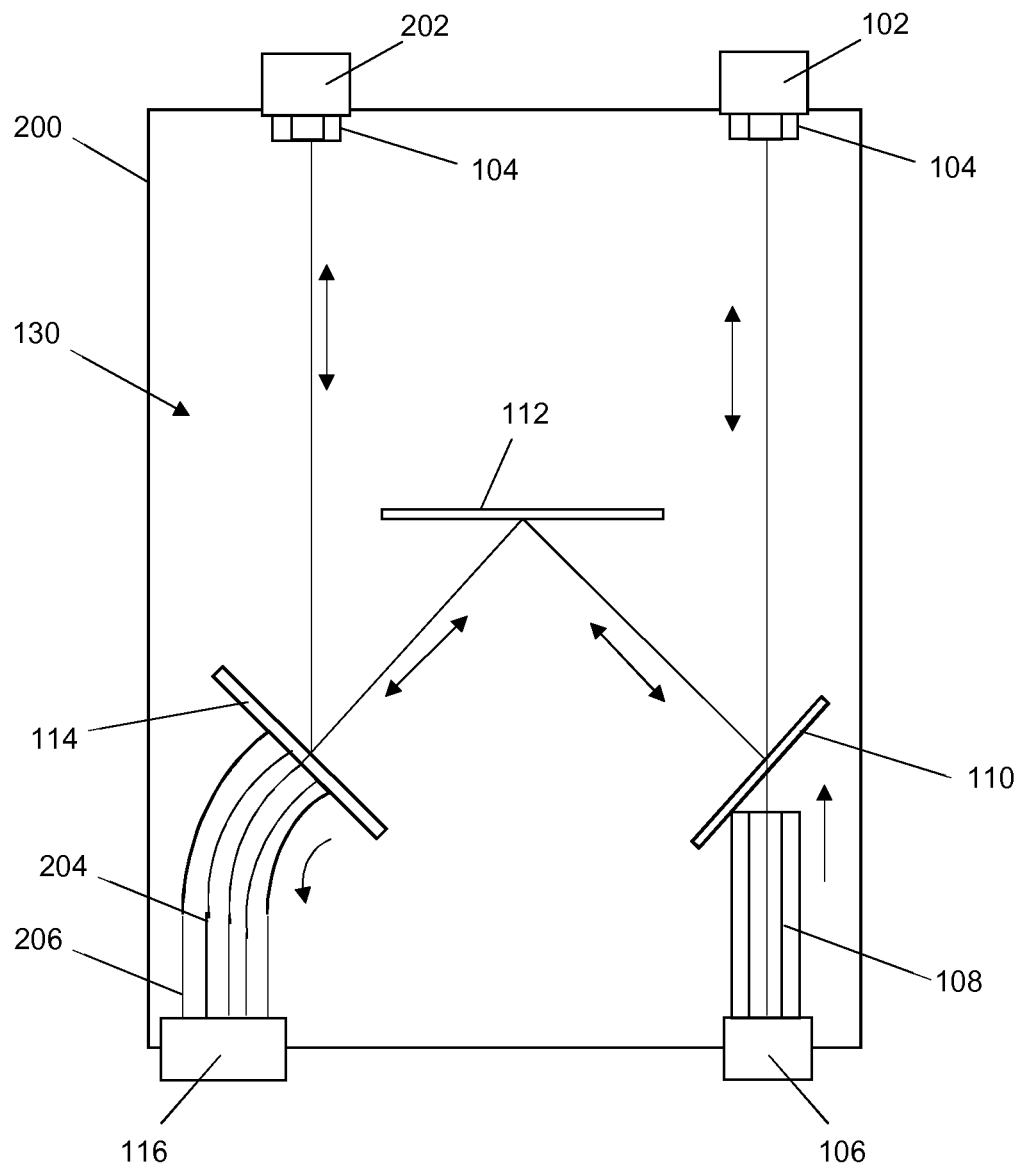

Referring to FIG. 2, another embodiment of the invention provides an optical add/drop device 200 additionally comprising an express port 202.

The mirror 112 is configured to reflect optical signals at all wavelengths received from the first wavelength selective optical filter towards the second wavelength selective optical filter and to reflect optical signals at all wavelengths received from the second wavelength selective optical filter towards the first wavelength selective optical filter.

In this embodiment, the second wavelength selective filter 114 is additionally configured to receive the optical signals from the common port, as reflected by the first wavelength selective optical filter 110 and the mirror 112, and to reflect optical signals not at the drop wavelength towards the express port. The second wavelength selective filter 114 is also configured to receive optical signals from the express port and reflect optical signals not at the drop wavelength towards the mirror.

The first wavelength selective filter 110 is additionally configured to receive the optical signals from the express port, as reflected by the second wavelength selective filter and the mirror, and to reflect these optical signals towards the common port 102.

The optical add/drop device 200 is therefore configured to transparently route 'by-pass' optical channels, i.e. optical signals not at the add wavelength or the drop wavelength, from the express port to the common port, or from the common port to the express port. The optical waveguide 204 has a curved path from the second wavelength selective optical filter 114 to the drop port 116. In this embodiment, the optical waveguide comprises an optical fibre 204 mounted in the curved bore of a curved optical ferule 206.

In an embodiment, the optical signals propagate in free space between the express port 202 and the second wavelength selective filter 114, and between the first wavelength selective filter 110, the mirror 112, and the second wavelength selective filter.

In an embodiment, the add port 106 and the drop port 116 comprise small form factor optical fibre connectors, such as LC connectors, configured to be pluggable directly into complementary connector sockets on an optical transceiver module, such as SFP, SFP+, QSFP, QSFP+, QSFP28, QSFP_DD, OSFP, CFP, CFP2, CFP4, and CFP8 standard optical transceivers.

The common port 102 and the express port 202 may comprise complementary optical connector sockets configured to receive small form factor optical fibre connectors, such as LC connectors, so that the common port and the express port are compatible with LC simplex fibre patchcords or LC duplex fibre patchcords.

Currently available passive optical add/drop filters are provided as a box, external to the node, able to receive in input a single fiber in SFW mode and add/drop N×wavelengths from a received aggregated optical signal. The dropped wavelengths are connected to the optical transceiver modules, e.g. DWDM or CWDM SFP, within the node by means of patch-cords between the external box and the transceiver modules.

The currently available passive optical add/drop filters typically have dimensions of in the range of 250/350 mm×200/300 mm×100/120 mm. They are conceived for network scenarios where a number of wavelengths are added/dropped per site. With the present components available on the market, the network designer is forced to use anyway the external box, designed to add/drop a higher number of λs, even where a few, or a single wavelength has to be added/dropped per node.

The optical add/drop device 100, 200 of the above embodiments is advantageously optimized for network scenarios where a single wavelength channel has to be added/dropped at a node. As a result of its structure, the optical add/drop device 100, 200 of the above embodiments can have very compact dimensions, of around 90 mm×15 mm×10 mm. The optical add/drop device 100, 200 of the above embodiments therefore provides a compact optical add/drop solution, optimized for the adding/dropping a single wavelength channel from an aggregated signal transported over a fiber in SFW mode.

Figure 3:
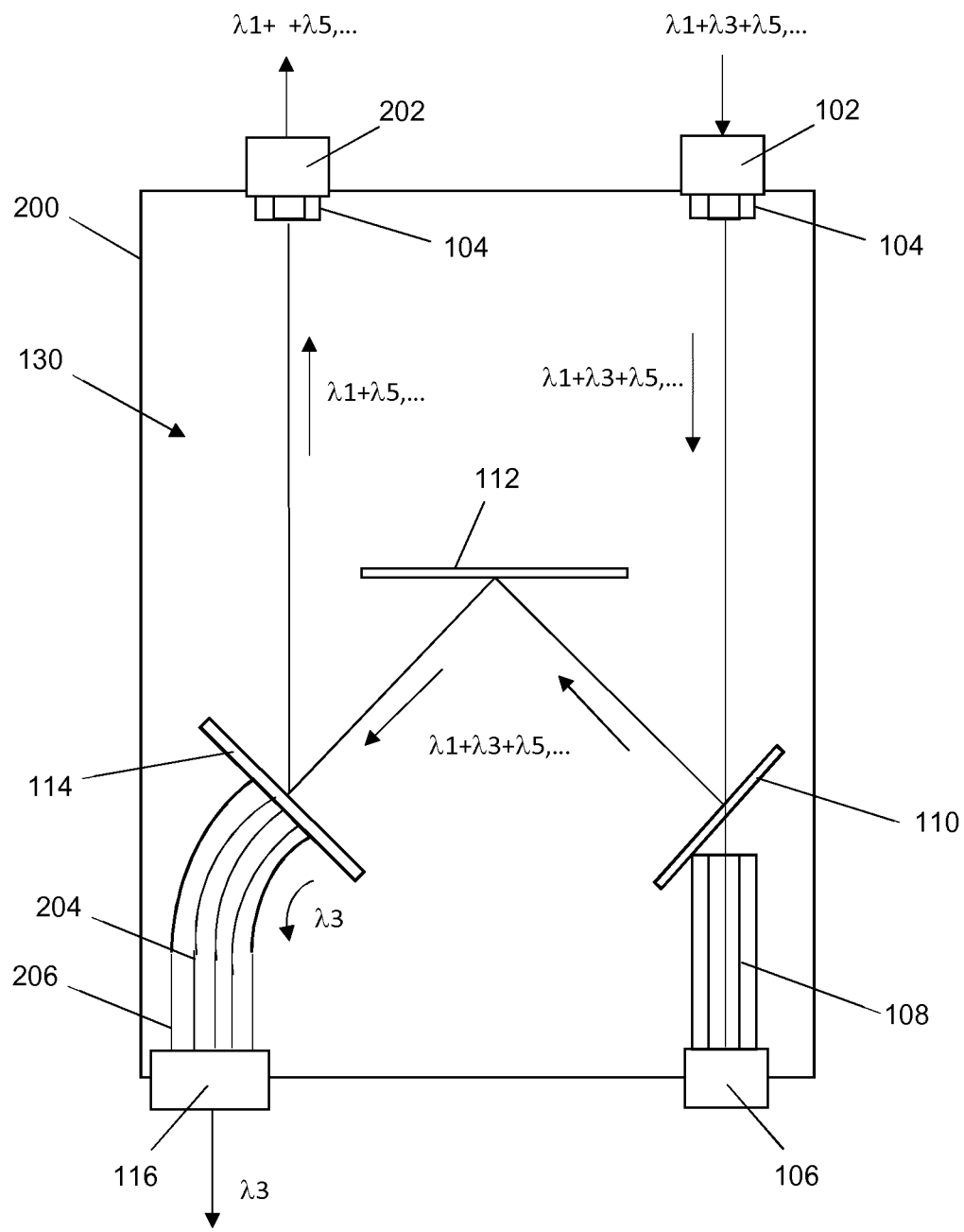
Figure 4:
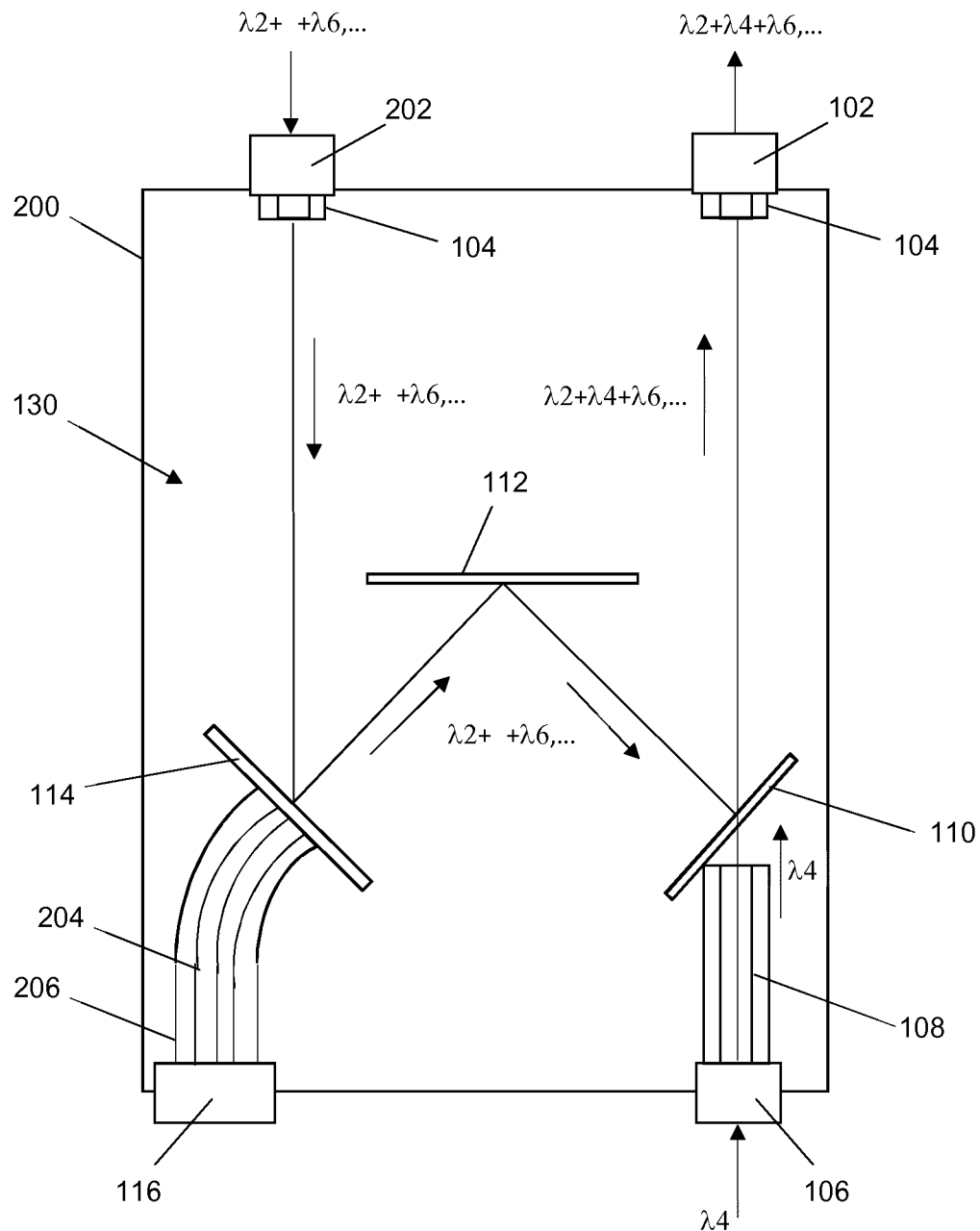

Referring to FIGS. 3 and 4, in an embodiment, the optical add/drop device 200 is configured to drop λ3 and add λ4.

FIG. 3 illustrates operation in the direction from the common port 102 to the express port 202. An aggregated optical signal comprising a plurality of optical signals at channel wavelengths λ1, λ3, λ5 etc. is received at the common port and transmitted in free space to the first wavelength selective optical filter 110. The first wavelength selective optical filter in this example is configured to transmit at add wavelength λ4 and to reflect all other wavelengths, so all of the optical signals λ1, λ3, λ5 etc. are reflected towards the mirror 112. The mirror is configured to reflect at all wavelengths, so all of the optical signals λ1, λ3, λ5 etc. are reflected towards the second wavelength selective optical filter 114. The second wavelength selective optical filter in this example is configured to transmit at drop wavelength λ3, i.e. to drop λ3, and to reflect all other wavelengths, i.e. λ1, λ5, etc., towards the express port 202. The optical signal at λ3 is delivered via the curved fibre 204 to the drop port 116.

FIG. 4 illustrates operation in the direction from the express port 202 to the common port 102. An aggregated optical signal comprising a plurality of optical signals at channel wavelengths λ2, λ6 etc. is received at the express port and transmitted in free space to the second wavelength selective optical filter 114. The second wavelength selective optical filter is configured to transmit at drop wavelength λ3 and to reflect all other wavelengths, so all of the optical signals λ2, λ6 etc. are reflected towards the mirror 112. The mirror is configured to reflect at all wavelengths, so all of the optical signals λ2, λ6 etc. are reflected towards the first wavelength selective optical filter 110. The first wavelength selective optical filter in this example is configured to transmit at add wavelength λ4, i.e. to add λ4, and to reflect all other wavelengths, i.e. λ2, λ6 etc., towards the common port 102. An optical signal at λ4 is delivered via the collimator lens 108 from the add port 106 to the first wavelength selective optical filter, where it is combined with the express channel wavelengths λ2, λ6 etc. to form an aggregated optical signal output from the common port comprising λ2, λ4, λ6 etc.

Figure 5:
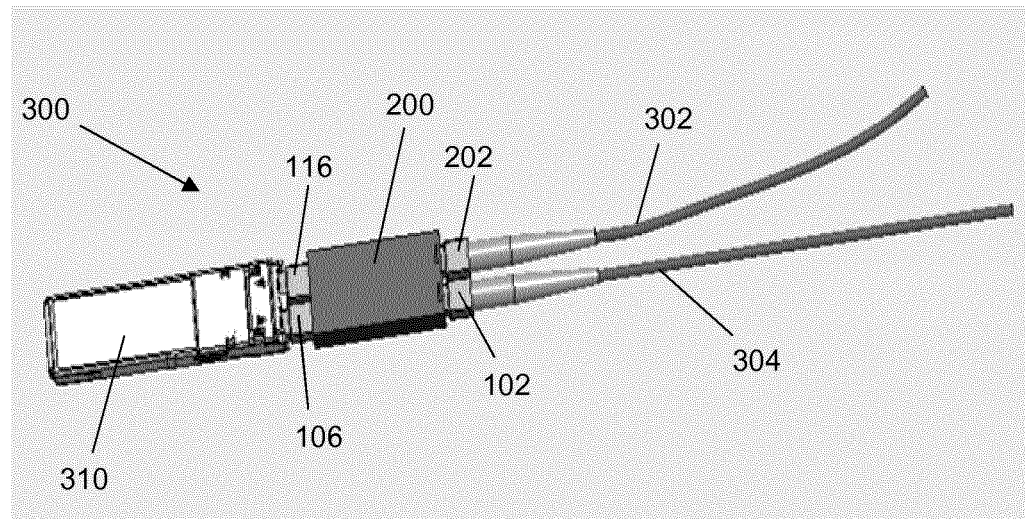
FIGS. 5 and 6 illustrate optical add/drop assemblies according to embodiments of the invention.

Referring to FIG. 5, an embodiment of the invention provides an optical add/drop assembly 300 comprising an optical add/drop device 200, as described above with reference to FIGS. 2 to 4, and an optical transceiver module 310.

It will be appreciated that an optical add/drop device 100 may alternatively be used when the optical add/drop assembly is used as a terminal.

The optical transceiver module 310 comprises an output port and an input port. The add port 106 of the optical add/drop device is connected to the output port of the optical transceiver module and the drop port 116 of the optical add/drop device is connected to the input port of the optical transceiver module. In this example, the drop port and the add port of the optical add/drop module comprise optical connectors configured to be directly plugged into complementary input port and output port connector sockets of the optical transceiver module.

In an embodiment, the add port 106 and the drop port 116 comprise small form factor optical fibre connectors, such as LC connectors, configured to be pluggable directly into complementary input port and output port connector sockets on the optical transceiver module.

The common port 102 and the express port 202 comprise complementary optical connector sockets configured to receive small form factor optical fibre connectors, such as LC connectors, so that the common port and the express port are compatible with LC simplex fibre patchcords or LC duplex fibre patchcords.

The optical transceiver module is configured to transmit an optical signal at the add wavelength from the output port and to receive an optical signal at the drop wavelength at the input port. The optical transceiver module may, for example, be a DWDM small form-factor pluggable, SFP, transceiver module or a CWDM SFP transceiver module. The optical transceiver may also be an SFP+, Quad SFP, QSFP+, QSFP28, QSFP double density, Octal SFP, C form-factor pluggable, CFP, CFP2, CFP4, or CFP8 optical transceiver module.

FIG. 5 additionally shows, for completeness only, optical fibre cables 302, 304, such as LC fibre patchcords, connected to the express port and the common port respectively. It will be appreciated that the cables do not form part of the optical add/drop device 200.

Figure 6:
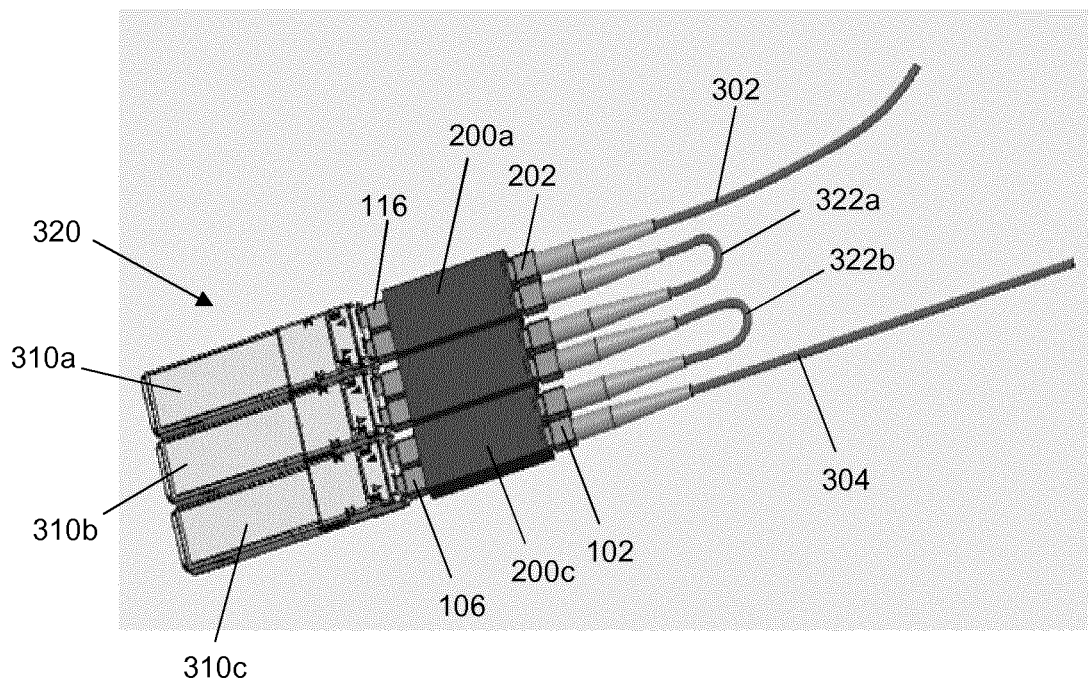

Referring to FIG. 6, an embodiment of the invention provides an optical add/drop assembly 320 comprising a plurality of optical add/drop devices 200, as described above with reference to FIGS. 2 to 4, and a corresponding plurality of optical transceiver modules 310.

Each optical add/drop device 200 is connected to a respective optical transceiver module. Each resulting optical transceiver module-optical add/drop device pair is configured to operate at a respective one of a plurality of add wavelengths and a respective one of a plurality of drop wavelengths.

The optical add/drop devices are connected in series with the common port 102 and the express port 202 of adjacent pairs of the optical add/drop devices being connected together. In this example of three optical add/drop devices 200a, 200b, 200c, the common port 102 of the first optical add/drop device 200a is connected to the express port 202 of the second optical add/drop device 200b by a first optical cable 322a, and the common port 102 of the second optical add/drop device 200b is connected to the express port 202 of the third optical add/drop device 200c by a second optical cable 322b. The optical add/drop devices 200 are therefore connected in a daisy-chain type configuration, enabling the optical add/drop assembly 320 to add three optical channel wavelengths and to drop three optical channel wavelengths.

The 'daisy-chain' configuration advantageously avoids the need to use an external box type passive optical add/drop filter even in scenarios where a few wavelengths have to be added/dropped in the same node. The optical add/drop assembly therefore simplifies the design of a network based on SFW technique, avoiding the need of external boxes, saving space, costs and simplifying the installation.

Figure 7:
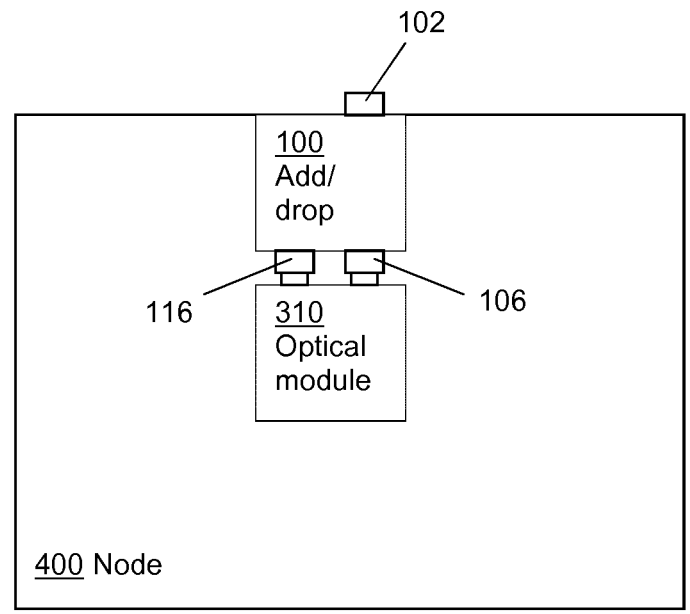
FIGS. 7 to 9 illustrate communications network nodes according to embodiments of the invention.

An embodiment of the invention provides a communications network node 400 as illustrated in FIG. 7. The node 400 comprises an optical add/drop assembly comprising an optical transceiver module 310 and an optical add/drop device 100 as described above with reference to FIG. 1.

Figure 8:
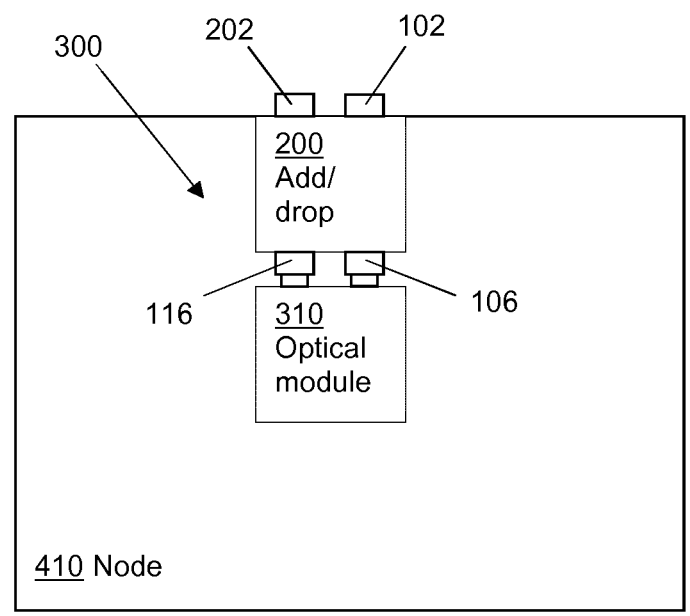

An embodiment of the invention provides a communications network node 410 as illustrated in FIG. 8. The node 410 comprises an optical add/drop assembly 300 as described above with reference to FIG. 5.

Figure 9:
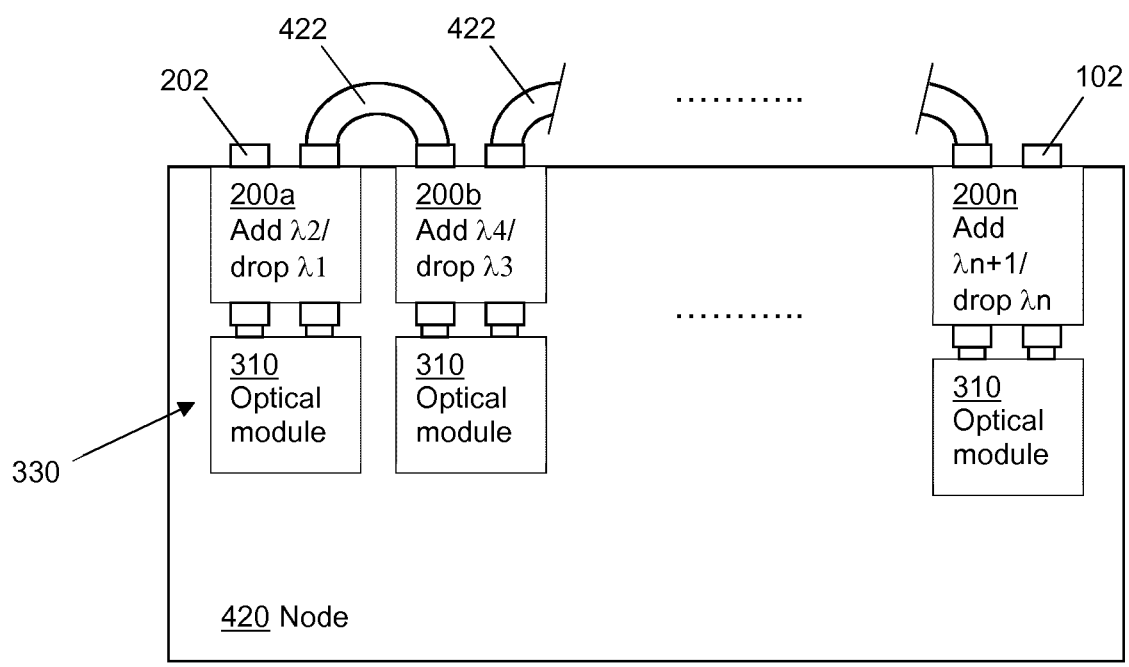

An embodiment of the invention provides a communications network node 420 as illustrated in FIG. 9. The node 420 comprises an optical add/drop assembly 330 similar to the optical add/drop assembly 320 as described above with reference to FIG. 6.

In this embodiment, the optical add/drop assembly comprises a plurality N of optical add/drop devices 200a-200n, and a corresponding plurality N of optical transceiver modules 310.

The invention claimed is:

1. An optical add/drop device comprising:
a common port;
an add port;
a first wavelength selective optical filter configured to:
receive an optical signal at an add wavelength from the add port and transmit said optical signal at the add wavelength towards the common port; and
receive optical signals from the common port and reflect optical signals not at the add wavelength;
a second wavelength selective optical filter configured to receive said optical signals from the common port reflected by the first wavelength selective optical filter and transmit an optical signal at a drop wavelength, different to the add wavelength, the optical signal being from among said optical signals received from the common port and reflected by the first wavelength selective optical filter;
a drop port;
an optical waveguide configured to receive said optical signal at the drop wavelength transmitted by the second wavelength selective optical filter and route said optical signal to the drop port; and
an express port,
wherein the second wavelength selective filter is additionally configured to:
receive said optical signals from the common port reflected by the first wavelength selective optical filter and reflect optical signals not at the drop wavelength towards the express port;
receive optical signals from the express port and reflect optical signals not at the drop wavelength;
wherein the first wavelength selective filter is additionally configured to receive said optical signals from the express port reflected by the second wavelength selective filter and reflect said optical signals towards the common port.

2. The optical add/drop device according to claim 1, wherein the optical signals propagate in free space between the common port and the first wavelength selective filter and between the first wavelength selective filter and the second wavelength selective filter.

3. The optical add/drop device according to claim 1, wherein the optical signals propagate in free space between the express port and the second wavelength selective filter and between the first wavelength selective filter and the second wavelength selective filter.

4. The optical add/drop device according to claim 1, wherein the optical waveguide has a curved path from the second wavelength selective optical filter to the drop port.

5. The optical add/drop device according to claim 1, wherein the optical waveguide comprises an optical fibre mounted in an optical ferule having a curved bore.

6. The optical add/drop device according to claim 1, wherein the first wavelength selective filter is configured to transmit a first wavelength channel of a wavelength grid of the communications network and reflect all other wavelength channels of said wavelength grid and the second wavelength selective filter is configured to transmit a second wavelength channel of said wavelength grid, different to the first wavelength channel, and reflect all other wavelength channels of said wavelength grid.

7. The optical add/drop device according to claim 1, wherein at least one of the first wavelength selective filter and the second wavelength selective filter comprises an optical thin film filter comprising a multi dielectric periodic structure.

8. The optical add/drop device according to claim 1, further comprising a mirror configured to reflect all wavelength channels received from the first wavelength selective filter towards the second wavelength selective filter and to reflect all wavelength channels received from the second wavelength selective filter towards the first wavelength selective filter.

9. The optical add/drop device according to claim 1, wherein the add port and the drop port comprise small form factor optical fibre connectors configured to be pluggable directly into complementary connector sockets on an optical transceiver module.

10. The optical add/drop assembly comprising:
the optical add/drop device according to claim 1; and
an optical transceiver module comprising an output port and an input port, wherein the optical transceiver module is configured to transmit an optical signal at the add wavelength from the output port and to receive an optical signal at the drop wavelength at the input port, and
wherein the add port of the optical add/drop device is connected to the output port of the optical transceiver module and the drop port of the optical add/drop device is connected to the input port of the optical transceiver module.

11. The optical add/drop assembly according to claim 10, comprising a plurality of optical transceiver modules and a plurality of optical add/drop devices each connected to a respective one of the optical transceiver modules, wherein each said optical transceiver module-optical add/drop device pair is configured to operate at a respective one of a plurality of add wavelengths and a respective one of a plurality of drop wavelengths, and wherein the optical add/drop devices are connected in series with the common port and the express port of adjacent pairs of the optical add/drop devices being connected.

12. The optical add/drop assembly according to claim 10 wherein the add port and the drop port comprise small form factor optical fibre connectors configured to be pluggable directly into complementary connector sockets on the optical transceiver module and wherein the output port and the input port of said optical transceiver module comprise optical connector sockets configured to receive small form factor optical fibre connectors and wherein the add port and drop port small form factor optical fibre connectors of a said optical add/drop device are directly plugged into the output port and input port optical connector sockets of a said optical transceiver module.

13. A communications network node comprising the optical add/drop assembly according to claim 10.

\* \* \* \* \*